June 2, 1953

C. R. HOUGHTON 2,640,428

DRIVE FOR FLUID HANDLING DEVICES OF THE
ROTARY, POSITIVE DISPLACEMENT TYPE

Filed May 3, 1949

INVENTOR.
Carl R. Houghton
BY
Cameron, Kerkam & Sutton
ATTORNEYS

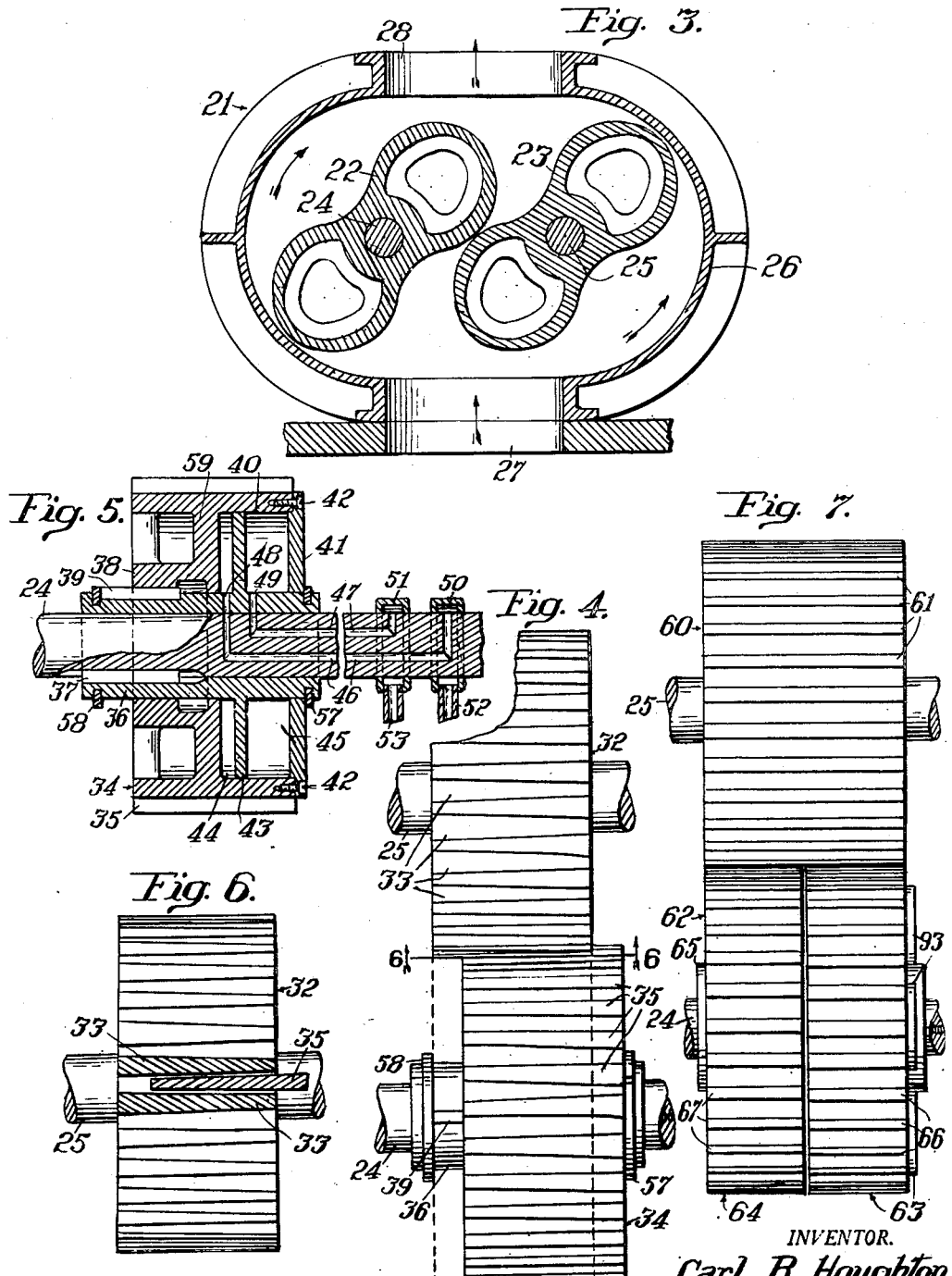

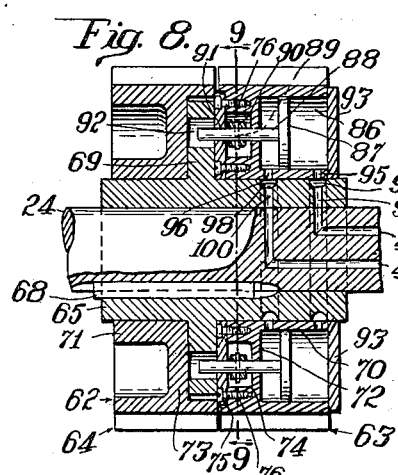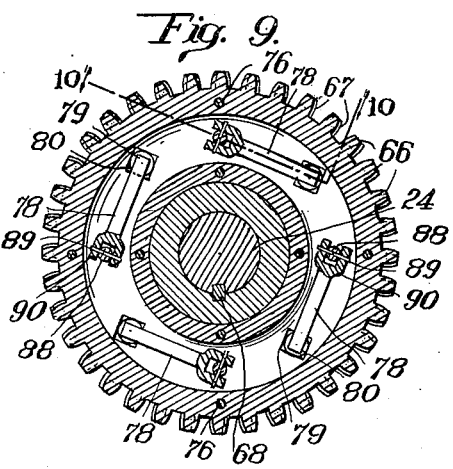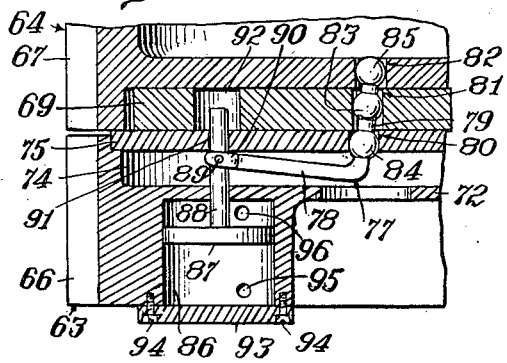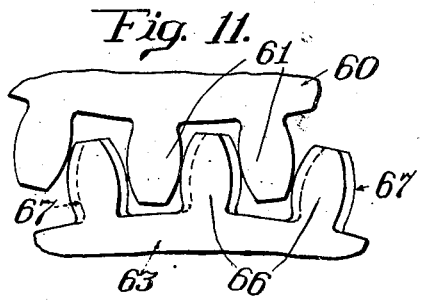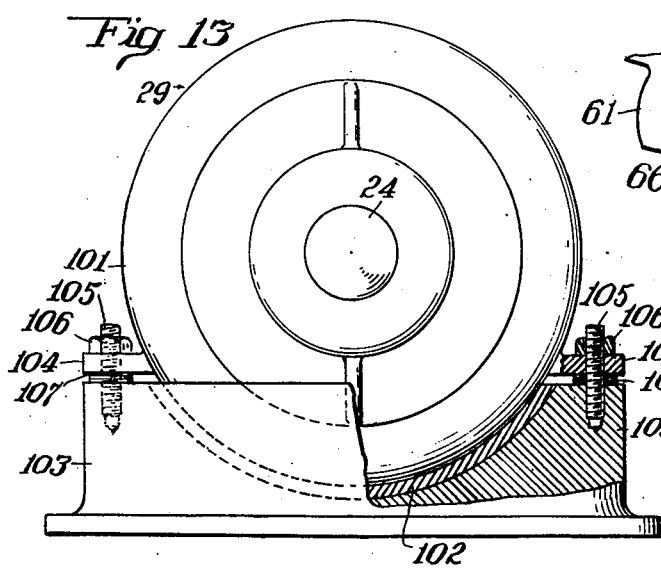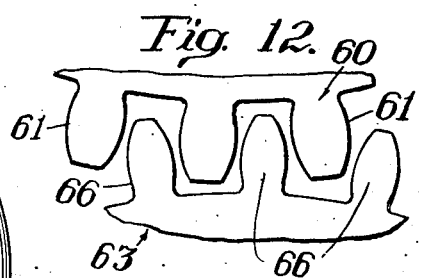

Patented June 2, 1953

2,640,428

UNITED STATES PATENT OFFICE 2,640,428

DRIVE FOR FLUID HANDLING DEVICES OF THE ROTARY, POSITIVE DISPLACEMENT TYPE

Carl R. Houghton, Connersville, Ind., assignor, by mesne assignments, to Dresser Industries, Inc., a corporation of Pennsylvania Application May 3, 1949, Serial No. 91,154

15 Claims. (Cl. 103—118)

This invention relates to pumps, blowers, compressors and exhausters of the rotary, positive displacement type, and is particularly directed to the means by which the rotors of such devices are driven in proper timed relation with one another.

Although the following description will, in the interest of simplicity, designate the devices as blowers and refer specifically to air blowers of the dual lobed impeller type, it will be understood that the invention is not limited to apparatus of this particular character, but is of general application to rotary, positive displacement devices for transporting or compressing fluid materials of all kinds.

It is customary to drive the two impellers of a rotary, positive displacement blower by connecting the shaft of one impeller to a source of power and driving the other shaft from the first one through gears which also serve to time or maintain the impellers in proper rotative relation. Although the frictional losses due to the use of such timing gears can be minimized by accurately machining the gears and running them in a bath of oil, there are certain installations in which a still further decrease in load is desirable.

It is therefore one of the principal objects of the present invention to provide a novel form of drive for a rotary, positive displacement blower which is capable of freeing the mechanism, during normal operation, of the load imposed by the timing gears.

In pursuing this general object, it is proposed to connect to the two rotor shafts a pair of synchronous motors which are capable of rotating the impellers in synchronism with one another without the necessity for a positive drive from one shaft to the other, and to also provide a set of timing gears which are so constructed that, when the motors are operated at synchronous speed, sufficient backlash may be introduced in the gearing to practically disengage the gear teeth and thus render the motors free of the load otherwise imposed by the gearing.

Another object of the invention is to provide a blower of the character described with a dual synchronous motor drive embodying a unique timing gear arrangement which may be rendered inoperative when the driving motors are rotating at synchronous speed.

A further object is to provide a novel timing gear construction for the motor driven impeller shafts of a Roots-type blower wherein the amount of backlash between the gear teeth may be varied during operation of the blower, either manually or automatically, so as to engage and disengage the gearing as desired.

These and other objects, including the provision of simple and efficient means for adjusting one of the synchronous motors of the blower drive relative to the other and for employing fluid pressure to engage and disengage the gearing, will appear more fully upon consideration of the detailed description of the embodiments of the invention which follows. Although certain specific forms of mechanism are described and illustrated in the accompanying drawings, it is to be expressly understood that these drawings are for the purpose of illustration only and are not to be construed as defining the scope of the invention, for which latter purpose reference should be had to the appended claims.

Referring now to the drawings, wherein like reference characters indicate like parts throughout the several views:

Fig. 3 is a vertical sectional view of the blower of Figs. 1 and 2 taken substantially on line 3—3 in Fig. 1;

Fig. 4 is a plan view, on an enlarged scale, of a timing gear arrangement adapted for embodiment in the blower installation of Figs. 1–3 wherein one of the gears is axially movable relative to the other to vary the backlash, this view showing the tapered construction of the gear teeth and indicating the two extreme positions of the movable gear;

Fig. 5 is a vertical axial sectional view of the movable gear of Fig. 4;

Fig. 6 is a vertical sectional view taken substantially on the line 6—6 in Fig. 4 showing the clearance between the tapered teeth of the gears when the movable gear has been shifted to the position shown in solid lines in Fig. 4;

Fig. 7 is a plan view of a modified form of timing gear embodying the invention wherein one of the gears is split perpendicularly to its axis and the two halves of said gear are rotatable in opposite directions relative to one another to vary the effective thickness of the gear teeth;

Figs. 8 and 9 are an axial sectional view and a radial sectional view taken substantially on line 9—9 in Fig. 8, respectively, of the split gear of Fig. 7 illustrating the fluid pressure means by which the two half gears are rotated relatively to one another;

Fig. 10 is a fragmentary sectional view taken substantially on the line 10—10 in Fig. 9;

Figure 1:
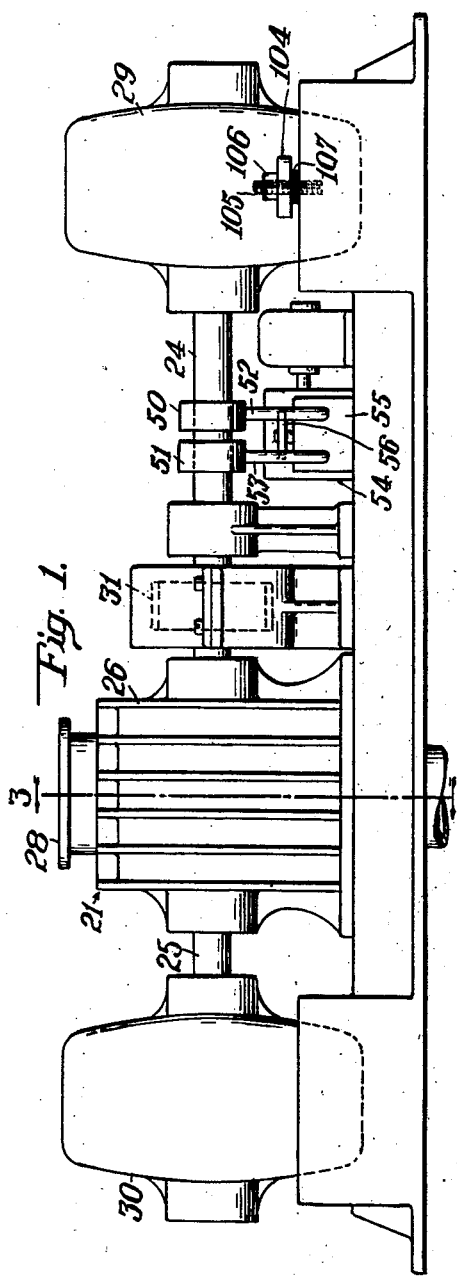
Figs. 1 and 2 are a side elevation and a plan view, respectively, of one form of blower installation embodying the invention.
Figure 2:
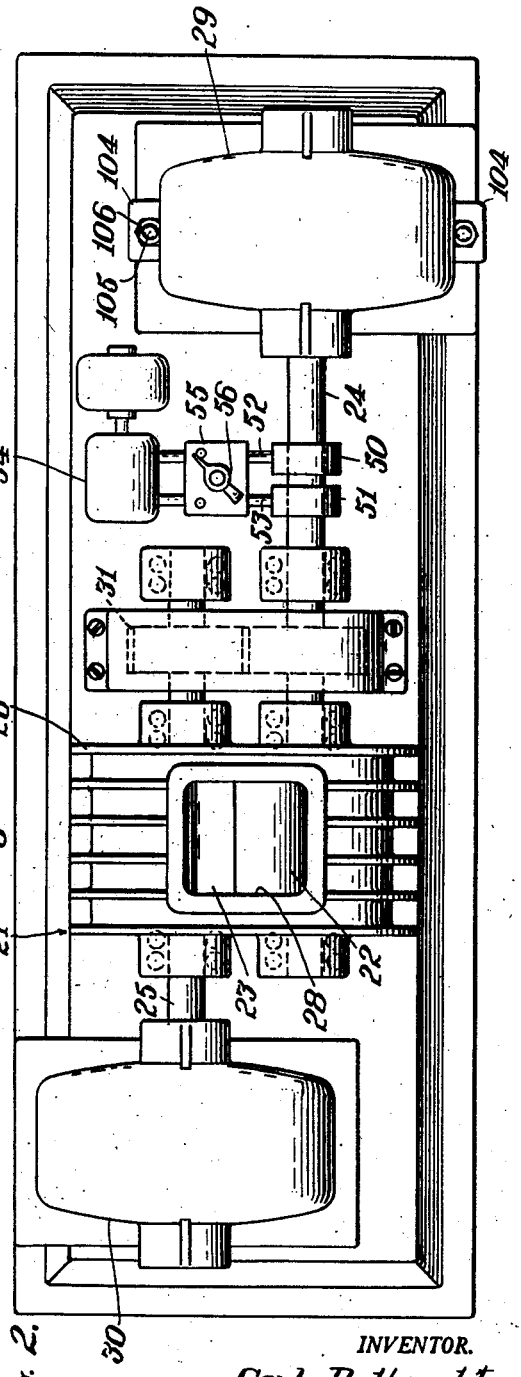

Figs. 11 and 12 are fragmentary diagrammatic views illustrating the shape of the gear teeth of the gearing of Figs. 7–10 and the relative positions of said teeth when in driving and disengaged positions, respectively; and Fig. 13 is an end view, partially in section, of one of the driving motors of the installation shown in Figs. 1 and 2 showing the means by which the stator of the motor may be adjusted so as to bring both motors into exact step with one another and thereby insure proper positioning of the gear teeth, particularly in the embodiment of Figs. 7–12.

As illustrated in Figs. 1–3, the invention may be embodied in a drive for a rotary, positive displacement blower 21 comprising a pair of lobed impellers 22 and 23 which are fixed to a pair of parallel shafts 24 and 25, respectively, and are adapted to be rotated thereby in opposite directions in the casing 26 so as to draw air through the inlet 27 and discharge it through the outlet 28 in accordance with the well known method of operation of this type of device. The impellers 22 and 23 are so formed that small, accurately gauged clearances are maintained at all times between the impellers themselves and between them and the casing. In order to mamintain this clearance between the impellers and to insure that they always occupy the proper angular positions relative to one another, it is essential that the impeller shafts 24 and 25 be rotated in synchronized and properly timed relation. Heretofore, this has been accomplished by driving one of the shafts from a suitable source of power and permanently gearing the second shaft to the first by a set of timing gears.

In lieu of the conventional arrangement for driving the impellers, the present invention provides a drive comprising a pair of synchronous motors 29 and 30 which are preferably directly connected to impeller shafts 24 and 25, respectively, and a set of timing gears, indicated generally at 31 in Figs. 1–3, which are so constructed that, when the motors 29 and 30 are operating at synchronous speed, sufficient backlash may be introduced in the gearing to, in effect, disengage the gear teeth and thus relieve the motors of the frictional load otherwise imposed by the gearing. Although the invention is not limited to any specific arrangement of gearing of this character, or to any particular means for varying the amount of backlash between the gear teeth, there have been disclosed herein two forms of gearing which are particularly adaptable to the purposes of the invention, and a simple and efficient system employing fluid pressure for engaging and disengaging the gear teeth. It will be understood that either of the two gearing arrangements hereinafter described may be used as the timing gears 31 of the blower installation illustrated in Figs. 1–3 without any other change in the apparatus.

Referring now to Figs. 4–6, the gearing shown therein comprises a pair of gears each provided with axially tapered teeth, one gear being permanently fixed to one of the impeller shafts, while the other gear is rotatable with the second shaft but also axially movable therealong by the application of fluid pressure through suitable passageways in said shaft. When the movable gear is shifted axially in one direction, its teeth are brought into mesh with those of the fixed gear so as to positively synchronize rotation of the impeller shafts even though the driving motors are not rotating at synchronous speed and in exact phase with one another. When the motors have been properly synchronized, the movable gear may be shifted in the opposite direction so that the narrower portions of its teeth move into the wider portions of the intertooth spaces of the other gear and there is substantially no engagement between the teeth as the shafts rotate.

As shown in Figs. 4–6, the shaft 25 has fixed thereto a gear 32 having axially tapered teeth 33, while a similar gear 34 having complementary axially tapered teeth 35 is mounted on shaft 24 by means of a hub or sleeve 36 in such manner that the gear 34 rotates with, but is capable of axial movement in both directions relatively to, the shaft 24. The hub 36 is fixed to the shaft 24 in any suitable manner, as by a driving fit key 37, and the hub portion 38 of gear 34 is slidably keyed or splined to the hub 36 as indicated at 39. One side of the gear 34, the right side as viewed in Fig. 4, is recessed as shown at 40 to provide an annular cavity surrounding the hub 36, the open side of said cavity being closed by a suitable cap plate 41 removably connected to the body of the gear as by screws 42. Fixed to and preferably formed integrally with the hub or sleeve 36 is an annular, radially extending web or diaphragm 43 which projects into the cavity in gear 34 and divides the latter into a pair of chambers 44 and 45, the periphery of the web 43 frictionally engaging the circumferential wall of the recess 40 in the gear 34, and the hub portion 38 and plate 41 likewise having frictional sliding contact with the hub 34 so as to make the two chambers 44 and 45 substantially fluidtight. If desired, suitable sealing means (not shown) may be employed for preventing leakage of fluid from said chambers along the hub or sleeve 36.

In order to shift the gear 34 axially with respect to the hub 36, means are provided for delivering a fluid under pressure, such as oil, to one or the other of the chambers 44 and 45 and simultaneously discharging or exhausting oil from the other chamber. In the embodiment of the invention illustrated, the shaft 24 is provided with a pair of passageways 46 and 47 which communicate with similar radially extending passageways 48 and 49 formed in the hub 36 and opening into chambers 44 and 45, respectively, at points closely adjacent web 43. The other ends of the passageways 46 and 47 in the shaft 24 are connected by suitable annular oil collars 50 and 51 surrounding the shaft 24 to a pair of oil lines 52 and 53 which, as shown in Figs. 1 and 2, are connected to the intake and discharge sides of a small motor-driven pump 54. A reversing valve mechanism 55 is interposed in the lines 52 and 53 so that either line may deliver oil under pressure from the pump 54 through the passageways in the shaft 24 and hub 36 to the appropriate chamber 44 or 45, while the other line serves to return the oil from the other chamber to the pump. The reversing valve 55 may be manually controlled by a handle 56, or, if desired, may be automatically actuated by a suitable electrical system controlled by a synchroscope or other device connected to the driving motors 29 and 30 and operative to turn the valve 55 in one direction or the other depending upon whether or not the two motors are running at synchronous speed and in phase with one another.

If desired, suitable stops may be provided for limiting the movement of the gear 34 along the hub 36, such as snap rings 57 and 58, these rings being so positioned that the gear cannot move far enough to cover the ends of the passageways 48 and 49 where the latter communicate with the chambers 44 and 45.

During normal operation of the blower 21, the motors 29 and 30 rotate at synchronous speed in phase with one another and the reversing valve 55 is so adjusted that oil under pressure is delivered from the pump 54 through the line 53, collar 51 and passageways 47 and 49 to the chamber 45, and, by thrusting against the cap plate 41, moves the gear 34 axially along the hub 36 to the right as viewed in Figs. 4 and 5 until plate 41 comes into contact with stop ring 57. The narrower portions of the teeth 35 are thereby moved into the wider portions of the spaces between the teeth 33 of the gear 32, thus introducing sufficient backlash, as indicated in Fig. 6, to practically disengage the gears from one another. With the valve in this position the chamber 44 is connected to the oil line 52 through the passageways 46 and 48 and oil collar 50 so that, as the gear 34 moves to the right, the oil may flow out of chamber 44 back to the intake side of the pump 54, it being understood that the pump is so constructed that, when the gear reaches either of its extreme shifted positions, oil is by-passed from the discharge to the intake side of the pump to avoid the creation of an excessive pressure in the chamber of the gear which is then connected to the discharge side.

When starting the blower, or whenever the driving motors 29 and 30 are not operating in synchronism, the gear 34 should be shifted to the left as viewed in the drawings, to the position indicated in broken lines in Fig. 4, so as to bring its teeth 35 into full mesh with the teeth 33 of gear 32 and thus positively interconnect and time the two shafts 24 and 25. To effect this movement of the gear 34, the reversing valve 55 is so adjusted as to deliver oil from the pump 54 to the chamber 44 through the line 52, oil collar 50 and passageways 46 and 48, whereupon the oil pressure in chamber 44 thrusting against the web 59 of the gear forces the latter to the left until the hub portion 38 engages stop ring 58. During this movement of the gear, oil is returned to the intake side of the pump from the chamber 45 through the passageways 47 and 49, collar 51 and line 53.

In the second gearing arrangement disclosed, illustrated in Figs. 7–12, one of the gears is split into two parts along a plane perpendicular to the axis of its shaft and embodies fluid pressure operated means for rotating the two parts in opposite directions to one another so as to either bring the gear teeth of the two parts into alignment, or offset them by a small amount which has the effect of increasing the thickness of each tooth over the full length of the gear face. The second gear of this set is solid, has a gear face equal in axial length to the sum of the two halves of the first gear, and is provided with intertooth spaces which are substantially wider than the individual teeth of the first gear. With this arrangement, when starting the blower or whenever the driving motors are not operating in synchronism, the fluid pressure is so applied as to offset the two parts of the first gear relatively to one another so that their teeth completely fill the intertooth spaces of the second gear and form a positive timing connection between the impeller shafts. When the motors reach synchronous speed, the movable halves of the first gear are again shifted by fluid pressure so that the teeth thereof are brought into alignment and are centered in the intertooth spaces of the second gear, whereupon the gears rotate without contact between the teeth as long as the synchronous motors maintain the same speed.

Referring now to Figs. 7–12, the shaft 25 is provided with a gear 60 having spur teeth 61 of standard form, the gear 60 being fixed to the shaft 25 in the usual manner. Mounted on the shaft 24 is a composite gear 62 formed of two parts 63 and 64 which are separated along a plane perpendicular to the axis of the shaft and are mounted on a hub or sleeve 65 for limited rotational movement relative to one another and to the hub, but are otherwise rotatable with the latter and the shaft 24. The gear parts 63 and 64 are provided with complementary teeth 66 and 67 having faces and flanks of the same shape as the teeth 61 of gear 60, but the thickness of which is substantially less than the width of the intertooth spaces of gear 60. The breadth or axial length of the teeth 61 of gear 60 is equal to the sum of the corresponding dimensions of the teeth 66 and 67 of gear 62. As is indicated best in Figs. 11 and 12, the gear teeth are so proportioned, and the gears 60 and 62 are so oriented on their shafts, that when the teeth 66 and 67 of the half gears 63 and 64 are in axial alignment, and the shafts are rotated in synchronism, there is no contact between the teeth of the two gears; but when the half gears 63 and 64 are rotated relatively to one another, the teeth 66 and 67 are offset sufficiently to effectively fill the intertooth spaces of gear 60 and form a normal driving connection between the gears.

In order to mount the part gears 63 and 64 on the shaft 24 in the desired manner, the hub or sleeve 65 is fixed to the shaft by a driving fit key 68 and is provided with an annular web or collar 69 intermediate its ends which projects radially outwardly between the two half gears 63 and 64, the latter having hub portions 70 and 71, respectively, journaled on the hub 65, and web portions 72 and 73, respectively, which connect the toothed rims thereof to the hub portions and lie on opposite sides of, and in contact with, the web 69.

The web portion 72 of part gear 63 is provided with an annular recess 74, the open or left-hand side of which is closed by a plate 75 removably connected to the part gear 63 by screws 76. Located in the recess 74 at circumferentially spaced positions are a plurality of generally L-shaped lever elements 77 which are adapted to impart limited rotational movement to the part gears 63 and 64 relative to one another and to the web 69. As shown best in Figs. 9 and 10, each of lever elements 77 comprises an elongated arm 78 which occupies a substantially chordal position relative to the outer peripheral wall of the recess 74, and a shorter arm 79 which is substantially perpendicular to the arm 78 and extends in a generally axial direction through openings 80, 81 and 82 in plate 75, web 69 and web portion 73 of gear 64, respectively. Each of lever elements 77 is fulcrumed in web 69 by means of a spherical enlargement 83 on the shorter arm 79 having a close fit in the opening 81, and is provided with operative connections to the plate 75 and web portion 73 which may likewise take the form of spherical enlargements 84 and 85 located in the openings 80 and 82, respectively. With this construction, rocking of the lever element 77 in the plane of Fig. 10 about the fulcrum formed by spherical enlargement 83 will, through engagement between the enlargements 84 and 85 and the walls of openings 80 and 82, impart slight rotational movements in opposite directions to the part gears 63 and 64.

Although various means may be provided for actuating the lever elements 77 in the desired manner by the application of fluid pressure from the pump 54, the embodiment illustrated comprises a plurality of cylinders 86, equal in number to, and axially aligned with the free ends of the elongated arms 78 of the lever elements 77, formed in the outer side of half gear 63, and a piston 87 in each of said cylinders having a piston rod 88 which extends parallel to the shaft 24, through the part of the web portion 72 forming the closed end of the cylinder 86 and into the recess 74 where it is connected by a pin 89 to the forked end 90 of the elongated arm 78 of the lever element 77. The end of each piston rod 88 may extend beyond the pin connection with the lever arm 78 into a guide bore 91 in the plate 75. If the piston rod 88 also projects beyond the plate 75, it is necessary to provide an enlarged opening 92 in web 69 to receive the end of the rod because the latter moves with the part gear 63 relatively to the web 69. Each of the cylinders 86 is provided with a suitable fluidtight cover plate 93 closing the outer end thereof, which plate is removably connected to the gear by screws 94.

In order to deliver and discharge oil to and from the cylinders 86, the hub portion 70 of part gear 63 is provided with a pair of radially extending passageways 95 and 96 leading to each of the cylinders at points adjacent the ends thereof, which passageways connect the chambers on the opposite sides of pistons 87 with annular grooves 97 and 98 formed in the outer periphery of hub or sleeve 65. The grooves 97 and 98 in turn communicate with radial passageways 99 and 100 in hub 65, the inner ends of which register with the passageways 47 and 46 in the shaft 24. As in the embodiment of Figs. 4–6, the passageways 46 and 47 in the shaft 24 are connected by the annular collars 50 and 51 to the oil lines 52 and 53 through which oil is delivered from and returned to the pump 54 under the control of valve mechanism 55 in the manner previously described.

Figs. 7–11 show the elements of the gearing in the positions occupied when starting the blower or when the driving motors are not rotating in synchronism and in phase with one another. At these times, the reversing valve 55 is so adjusted that oil is delivered from the pump 54 through the line 53, collar 51, shaft passageway 47, hub passageway 99, groove 97 and passageways 95 to the chambers in the cylinders 86 which lie to the right of the pistons 87, the oil pressure forcing the pistons to the left to the positions indicated in Figs. 8 and 10. When the pistons are thus moved, the lever elements 77 are rocked in a clockwise direction about the fulcrums formed by the spherical enlargements 83 until the forked ends 90 of said elements abut the plate 75, at which time the part gears 63 and 64 have been rotated in opposite directions relative to one another and to the web 69 so that the teeth 66 and 67 are out of alignment and effectively fill the intertooth spaces of the gear 60 in the manner indicated in Fig. 11, thereby providing a direct drive between the shafts 24 and 25.

When the motors 29 and 30 have been brought up to synchronous speed and are in phase, the valve 55 is reversed so as to supply oil under pressure to the left-hand sides of pistons 87 and move the latter to the right as viewed in Figs. 8 and 10 until the forked ends 90 of the lever elements 77 abut the web portion 72 of half gear 63 forming the end wall of the recess 74, at which time rocking of the lever elements 77 has so rotated half gears 63 and 64 as to bring the teeth thereof into alignment and center the latter into the intertooth spaces of gear 60, as illustrated in Fig. 12. The shafts 24 and 25 may then be rotated without contact between the teeth of the respective gears carried thereby as long as the motors 29 and 30 rotate in synchronism.

Since it is essential that the motors 29 and 30 be in perfect step with one another in order to properly center the teeth of the gears on shafts 24 and 25 when the gears are in disengaged position, simple and efficient means have been provided for adjusting one of the motors for this purpose. As indicated in Figs. 1, 2 and 13, the lower cylindrical surface of stator 101 of motor 29 rests on a similarly curved liner 102 in a base 103 and the stator is provided with a pair of laterally extending lugs or ears 104 by which it is fixed to the base 103 with bolts 105 and nuts 106. Interposed between each of the lugs 104 and the upper surface of base 103 are a plurality of removable shims 107. With this construction, it is apparent that, by increasing the number of shims beneath one of the lugs 104 and decreasing the number under the other lug, the stator 101 may be rotatably adjusted about the axis of the shaft 24 to bring the rotor of motor 29 into perfect step with that of the motor 30.

There is thus provided by the present invention a new and improved form of drive for fluid handling devices of the rotary, positive displacement type wherein synchronous motors are employed for driving the impeller shafts during normal operation, and which also includes a timing gear arrangement for effectively maintaining the proper rotative relationship between the impellers during starting and whenever the motors are not operating in synchronism, but which may be disengaged when the device is operating normally so as to relieve the motors of the frictional load imposed by the gearing. Although one form of blower installation and two specifically different gearing arrangements have been described and illustrated in the accompanying drawings, it will be obvious that the invention is not limited to the particular structures shown, but is capable of a variety of mechanical embodiments. For example, it should be apparent that the drive is applicable to various fluid transporting and compressing devices other than the Roots-type blower illustrated, and that other forms of variable backlash gearing may be substituted for the gearing arrangements herein disclosed. It will also be evident that, in the arrangement of Figs. 7–12, the number of gear shifting pistons and lever elements may be varied in accordance with the size of the gears, and that other means for converting the rocking movements of the levers into rotational movement of the part gears may be substituted for the particular construction shown in the drawings. Likewise, instead of using a reversing valve in conjunction with a continuously operating motor driven pump for supplying the fluid pressure for shifting the gearing, it is obvious that a reversible type, intermittently operated pump may be employed. It is also apparent that there are other mechanisms available for effecting engagement and disengagement of the timing gears, that might be employed in lieu of the fluid pressure means illustrated, one such alternative being to use fluid pressure or electromagnetic means for the disengaging operation and spring means for returning the gears to engaged position, the advantage of the latter arrangement being automatic gear engagement in the event of an electric power failure.

Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. A drive for a fluid handling device of the rotary, positive displacement type having a pair of rotors mounted on parallel shafts, comprising a pair of synchronous motors connected to the rotor shafts, timing gears mounted on said shafts adapted to be engaged for maintaining the shafts and their rotors in proper rotative relation whenever said motors are not operating in synchronism, and means for disengaging said gears so that said shafts may be driven by said motors without subjecting the latter to the load otherwise imposed by engagement of said gears.

2. A drive for a fluid handling device of the rotary, positive displacement type having a pair of rotors mounted on parallel shafts, comprising a pair of synchronous motors connected to the rotor shafts, timing gears mounted on said shafts adapted to be engaged for maintaining the shafts and their rotors in proper rotative relation whenever said motors are not operating in synchronism, and means operable during rotation of the shafts for rendering said gears ineffective as a positive connection between said shafts so that the shafts may be driven by said motors without subjecting the latter to the load otherwise imposed by said gears.

3. A drive for a fluid handling device of the rotary, positive displacement type having a pair of rotors mounted on parallel shafts, comprising a pair of synchronous motors connected to the rotor shafts, timing gears mounted on said shafts adapted to be engaged for maintaining the shafts and their rotors in proper rotative relation whenever said motors are not operating in synchronism, and fluid pressure actuated means for moving the teeth of one of said gears out of contact with the teeth of the other gear so that said shafts may be driven by said motors without subjecting the latter to the load otherwise imposed by engagement of said gears.

4. A drive for a fluid handling device of the rotary, positive displacement type having a pair of rotors mounted on parallel shafts, comprising a pair of synchronous motors connected to the rotor shafts, timing gears mounted on said shafts adapted to be engaged for maintaining the shafts and their rotors in proper rotative relation whenever said motors are not operating in synchronism, both of said gears being fixed to said shafts for rotation therewith, the teeth of one of said gears being movable relatively to the associated shaft so as to disengage the teeth of the other gear, and means for moving said movable gear teeth to disengaged position to render said gears ineffective as a positive connection between said shafts.

5. A drive for a fluid handling device of the rotary, positive displacement type having a pair of rotors mounted on parellel shafts, comprising a pair of synchronous motors connected to the rotor shafts, timing gears mounted on said shafts adapted to be engaged for maintaining the shafts and their rotors in proper rotative relation whenever said motors are not operating in synchronism, both of said gears being fixed to said shafts for rotation therewith, the teeth of one of said gears being axially movable relatively to the teeth of the other gear, and means for moving said movable gear teeth out of and into engagement with the teeth of the other gear so as to render said gears ineffective and effective, respectively, as a positive connection between said shafts.

6. A drive for a fluid handling device of the rotary, positive displacement type having a pair of rotors mounted on parallel shafts, comprising a pair of synchronous motors connected to the rotor shafts, timing gears mounted on said shafts adapted to be engaged for maintaining the shafts and their rotors in proper rotative relation whenever said motors are not operating in synchronism, both of said gears being fixed to said shafts for rotation therewith, the effective thickness of the teeth of one of said gears being variable relative to the width of the tooth spaces of the other gear, and means for carying the effective thickness of the teeth of said first named gear so as to either eliminate backlash between the gears or make the backlash sufficiently great to avoid contact between the teeth of said gears as said shafts are rotated in synchronism by said motors.

7. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear fixed to the second shaft for rotation therewith and having a toothed portion movable relatively to said shaft, movement of said toothed portion in opposite directions moving the teeth thereof into and out of contact with the teeth of said first gear, and means for positively moving said toothed portion in opposite directions relatively to said second shaft.

8. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft and a toothed portion movably mounted on said hub, movement of said toothed portion in opposite directions moving the teeth thereof into and out of contact with the teeth of said first gear, and fluid pressure means for positively moving said toothed portion in opposite directions relatively to said hub, including a pair of fluid chambers within the movable toothed portion of said second gear and means for delivering and exhausting fluid to and from said chambers, delivery of fluid under pressure to one of said chambers moving said toothed portion in one direction while delivery to the other chamber moves said toothed portion in the opposite direction.

9. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft and a toothed portion mounted on said hub for axial movement therealong, both of said gears having axially tapered teeth whereby axial movement of the toothed portion of said second gear brings the teeth thereof into and out of contact with the teeth of said first gear, and means for positively moving said toothed portion axially in both directions relatively to said hub.

10. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear rotatable with the second shaft but axially movable therealong, both of said gears having axially tapered teeth whereby axial movement of said second gear brings the teeth thereof into and out of contact with the teeth of said first gear, and fluid pressure means for positively moving said second gear axially in both directions relatively to its shaft, including a cavity in said second gear, a radially extending member fixed with respect to said second shaft projecting into said cavity and dividing the latter into a pair of fluid chambers, and means for delivering and exhausting fluid to and from said chambers, delivery of fluid under pressure to one of said chambers moving said second gear in one direction while delivery to the other chamber moves said gear in the opposite direction.

11. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft and a toothed portion mounted on said hub for axial movement therealong, both of said gears having axially tapered teeth whereby axial movement of the toothed portion of said second gear brings the teeth thereof into and out of contact with the teeth of said first gear, and fluid pressure means for positively moving said toothed portion axially in both directions relatively to said hub, including an annular cavity in said toothed portion, an annular, radially extending member on said hub projecting into said cavity and dividing the latter into a pair of fluid chambers, and means including a pair of fluid passageways formed in said hub and said second shaft for delivering and exhausting fluid to and from said chambers, delivery of fluid under pressure to one of said chambers moving said toothed portion in one direction while delivery to the other chamber moves said toothed portion in the opposite direction.

12. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft and a pair of complementary toothed portions mounted on said hub for limited rotational movement in opposite directions relatively to one another and to the hub so as to bring the teeth thereof into and out of axial alignment, the thickness of the teeth of each of said toothed portions being less than the width of the intertooth spaces of said first gear and said gears being so oriented that when the shafts are rotated in synchronism and the teeth of the toothed portions of said second gear are in axial alignment they do not contact the teeth of said first gear, but when the teeth of said toothed portions are moved out of axial alignment they effectively fill the intertooth spaces of said first gear and form a normal driving connection between the gears, and means for rotating said toothed portions in opposite directions relatively to one another and to said hub.

13. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft and a pair of complementary toothed portions mounted on said hub for limited rotational movement in opposite directions relatively to one another and to the hub so as to bring the teeth thereof into and out of axial alignment, the thickness of the teeth of each of said toothed portions being less than the width of the intertooth spaces of said first gear and said gears being so oriented that when the shafts are rotated in synchronism and the teeth of the toothed portions of said second gear are in axial alignment they do not contact the teeth of said first gear, but when the teeth of said toothed portions are moved out of axial alignment they effectively fill the intertooth spaces of said first gear and form a normal driving connection between the gears, and fluid pressure means for positively rotating said toothed portions in opposite directions relatively to one another and to said hub.

14. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft, a radially extending member on said hub and a pair of complementary toothed portions mounted on said hub on opposite sides of said member for limited rotational movement in opposite directions so as to bring the teeth thereof into and out of axial alignment, the thickness of the teeth of each of said toothed portions being less than the width of the intertooth spaces of said first gear and said gears being so oriented that when the shafts are rotated in synchronism and the teeth of the toothed portions of said second gear are in axial alignment they do not contact the teeth of said first gear, but when the teeth of said toothed portions are moved out of axial alignment they effectively fill the intertooth spaces of said first gear and form a normal driving connection between the gears, and fluid pressure means for positively rotating said toothed portions in opposite directions relatively to one another and to said hub, including at least one lever fulcrumed in the radially extending member of the hub of said second gear and engaging said toothed portions at opposite sides of said fulcrum, a cylinder in one of said toothed portions, a piston in said cylinder dividing the latter into a pair of fluid chambers, means connecting said piston to said lever so as to rock the latter about its fulcrum, and means for delivering and exhausting fluid to and from said chambers.

15. A drive for a fluid handling device of the rotary, positive displacement type having a pair of rotors mounted on parallel shafts, comprising a pair of synchronous motors connected to the rotor shafts, gearing mounted on said shafts adapted to be engaged for maintaining the shafts and their rotors in proper rotative relation whenever said motors are not operating in synchronism and to be disengaged when said shafts and rotors are rotated in synchronism by said motors, said gearing comprising a first gear fixed to one of said shafts, a second gear having a hub fixed to the second shaft, a radially extending member on said hub and a pair of complementary toothed portions mounted on said hub on opposite sides of said member for limited rotational movement in opposite directions so as to bring the teeth thereof into and out of axial alignment, the thickness of the teeth of each of said toothed portions being less than the width of the intertooth spaces of said first gear and said gears being so oriented that when the shafts are rotated in synchronism and the teeth of the toothed portions of said second gear are in axial alignment they do not contact the teeth of said first gear, but when the teeth of said toothed portions are moved out of axial alignment they effectively fill the intertooth spaces of said first gear and form a normal driving connection between the gears, and fluid pressure means for positively rotating said toothed portions in opposite directions relatively to one another and to said hub, including a plurality of levers each having a substantially axially extending portion fulcrumed in the radially extending member of the hub of said second gear and connected to said toothed portions on opposite sides of said fulcrum and a second portion substantially perpendicular to said axially extending portion, a plurality of circumferentially spaced cylinders in one of said toothed portions, a piston in each of said cylinders dividing the latter into a pair of fluid chambers, means connecting each of said pistons to the second portion of one of said levers so as to rock the latter about its fulcrum and means including passageways formed in said hub and said second shaft for delivering fluid to and from said chambers.

CARL R. HOUGHTON.

References Cited in the file of this patent

UNITED STATES PATENTS

| Number | Name | Date |
|---|---|---|
| 79,605 | Sibley | July 7, 1868 |
| 1,078,774 | Dalton | Nov. 18, 1913 |
| 1,132,747 | Sundh | Mar. 23, 1915 |
| 1,334,517 | Bryan | Mar. 23, 1920 |
| 2,302,575 | Romaine et al. | Nov. 17, 1942 |
| 2,533,043 | Price | Dec. 5, 1950 |